United States Patent
Cao et al.

(10) Patent No.: US 10,993,093 B2
(45) Date of Patent: Apr. 27, 2021

(54) METHOD, DEVICE, AND SYSTEM FOR ALLOCATING TRANSMISSION RESOURCES IN VEHICLE-TO-ENTITY (V2X) COMMUNICATIONS

(71) Applicant: Huawei Technologies Co., Ltd., Shenzhen (CN)

(72) Inventors: Zhenzhen Cao, Beijing (CN); Hang Liu, Beijing (CN); Xiao Xiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 16/365,925

(22) Filed: Mar. 27, 2019

(65) Prior Publication Data
US 2019/0222982 A1 Jul. 18, 2019

Related U.S. Application Data

(63) Continuation of application No. PCT/CN2016/101236, filed on Sep. 30, 2016.

(51) Int. Cl.
*H04W 4/40* (2018.01)
*H04W 72/04* (2009.01)
(Continued)

(52) U.S. Cl.
CPC ............ *H04W 4/40* (2018.02); *H04L 1/0003* (2013.01); *H04W 72/0473* (2013.01); *H04W 72/10* (2013.01); *H04W 76/27* (2018.02)

(58) Field of Classification Search
CPC combination set(s) only.
See application file for complete search history.

(56) References Cited

U.S. PATENT DOCUMENTS

2008/0181150 A1* 7/2008 Won .................. H04L 47/626
370/310
2015/0173048 A1 6/2015 Seo et al.
(Continued)

FOREIGN PATENT DOCUMENTS

CN 102244683 A 11/2011
CN 104519577 A 4/2015
(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 13)," 3GPP TS 36.304 V13.2.0, Jun. 2016, 46 pages.
(Continued)

*Primary Examiner* — Mounir Moutaouakil
(74) *Attorney, Agent, or Firm* — Slater Matsil, LLP

(57) ABSTRACT

A vehicle-to-entity (V2X) communication method, device, and system, the method including obtaining, by a terminal, a correspondence between a priority of a pedestrian-to-entity (P2X) service data packet and a V2X communication parameter value range, where the V2X communication parameter comprises at least one of a modulation and coding scheme (MCS), a quantity of transmissions, a transmit power, or a quantity of occupied resource blocks (RBs), determining, by the terminal, according to the priority of the P2X service data packet and the correspondence, a V2X communication parameter value range corresponding to the priority of the P2X service data packet, selecting, by the terminal, a V2X communication parameter value from the determined V2X communication parameter value range, and transmitting, by the terminal, the P2X service data packet on a radio resource according to the selected V2X communication parameter value.

12 Claims, 9 Drawing Sheets

(51) Int. Cl.
*H04W 76/27* (2018.01)
*H04L 1/00* (2006.01)
*H04W 72/10* (2009.01)

(56) References Cited

U.S. PATENT DOCUMENTS

| | | | |
|---|---|---|---|
| 2016/0183276 A1 | 6/2016 | Marinier et al. | |
| 2017/0019812 A1* | 1/2017 | Lee | H04W 4/44 |
| 2017/0230923 A1 | 8/2017 | Huang et al. | |
| 2018/0115970 A1* | 4/2018 | Chae | G08G 1/012 |
| 2018/0159935 A1* | 6/2018 | Cavalcanti | H04W 4/40 |
| 2018/0184460 A1* | 6/2018 | Hou | H04W 74/0833 |
| 2018/0234807 A1* | 8/2018 | Park | H04W 72/005 |
| 2018/0242115 A1* | 8/2018 | Kim | H04W 4/40 |
| 2018/0242302 A1* | 8/2018 | Lee | H04L 5/0069 |
| 2018/0249307 A1* | 8/2018 | Kim | H04L 5/0012 |
| 2018/0255558 A1* | 9/2018 | Lee | H04W 76/14 |
| 2018/0262887 A1* | 9/2018 | Futaki | H04W 36/30 |
| 2018/0263052 A1* | 9/2018 | Xu | H04Q 11/02 |
| 2018/0332602 A1* | 11/2018 | Lee | H04W 72/02 |

FOREIGN PATENT DOCUMENTS

| | | |
|---|---|---|
| CN | 104780016 A | 7/2015 |
| CN | 105246025 A | 1/2016 |
| CN | 105517168 A | 4/2016 |
| JP | 2016527845 A | 9/2016 |
| WO | 2015178851 A1 | 11/2015 |
| WO | 2016019734 A1 | 2/2016 |

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, Sep. 2016, 406 pages.

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.2.0, Jun. 2016, 623 pages.

"Details of sensing using autonomous resource selection for V2V," Agenda item: 7.2.2.2.1, Source: Qualcomm Incorporated, Document for: Discussion/Decision, 3GPP TSG-RAN WG1 #86, R1-166257, Aug. 22-26, 2016, 11 pages.

"Discussion on Network Control Aspects for V2V Communication," Source: Intel Corporation, Agenda Item: 6.2.8.1.1, Document for: Discussion and Decision, 3GPP TSG RAN WG1 Meeting #83, R1-156689, Anaheim, USA, Nov. 15-22, 2015, 7 pages.

"Scheduling Assignment Design for V2V," Agenda Item: 7.2.2.5, Source: Huawei, HiSilicon, Document for: Discussion and Decision, 3GPP TSG RAN WG1 Meeting #86, R1-166202, Gothenburg, Sweden, Aug. 22-26, 2016, 4 pages.

"Variable Number of Transmissions for V2V," Agenda Item: 6.2.2.5, Source: Huawei, HiSilicon, Document for: Discussion and Decision, 3GPP TSG WG1 Meeting #85, R1-164817, Nanjing, China, May 23-27, 2016, 4 pages.

"Discussion on Resource Pool for PC5 based V2V Communications," Source: NTT Docomo, Agenda Item: 6.2.2.4, Document for: Discussion and Decision, 3GPP TSG RAN WG1 Meeting #85, R1-165195, Nanjing, China May 23-27, 2016, 4 pages.

"Discussion on the Remaining Issues for Priority Handling," Agenda Item: 7.2.2.2.1, Source: Huawei, HiSilicon, Document for: Discussion and Decision, 3GPP TSG RAN WG1 Meeting #86, R1-166204, Gothenburg, Sweden, Aug. 22-26, 2016, 2 pages.

"Discussion on P-UE Sidelink Transmissions," Agenda item: 7.2.3.2, Source: LG Electronics, Document for: Discussion and Decision, 3GPP TSG RAN WG1 Meeting #86, R1-166838, Gothenburg, Sweden Aug. 22-26, 2016, 4 pages.

* cited by examiner

METHOD, DEVICE, AND SYSTEM FOR ALLOCATING TRANSMISSION RESOURCES IN VEHICLE-TO-ENTITY (V2X) COMMUNICATIONS

CROSS-REFERENCE TO RELATED APPLICATIONS

This application is a continuation of International Application No. PCT/CN2016/101236, filed on Sep. 30, 2016, the disclosure of which is hereby incorporated by reference in its entirety.

TECHNICAL FIELD

The present invention relates to the field of wireless communications technologies, and in particular, to a V2X communication method, device, and system.

BACKGROUND

A large quantity of traffic accidents happen globally every year, causing numerous casualties and great damage to property. A main cause of a traffic accident is a lack of a reliable information exchange mechanism between vehicles. An Internet of Vehicles system is used to improve road safety, improve transportation efficiency, and provide abundant streaming services to a user through vehicle-to-X (vehicle-to-entity, V2X) communication. Specifically, V2X includes vehicle to vehicle (V2V), vehicle to infrastructure (V2I), and vehicle to pedestrian (V2P).

Using V2V communication as an example, as shown in FIG. 1, V2V data packets for communication between a vehicle A and a vehicle B include data packets of different service types, such as a cooperative awareness message (CAM) type, a decentralized environmental notification message (DENM) type, and a basic safety message (BSM) type. Specifically, a V2X data packet of the CAM type includes basic travel information of a vehicle, such as a current location, a current speed, and a current direction of the vehicle, and a V2X data packet of the DENM type includes information about some emergency states currently triggered by the vehicle, such as emergency braking.

However, due to an increase in a quantity of vehicles and limited transmission resources in the Internet of Vehicles system, to improve road safety, in the prior art, because information included in data packets of different service types is different in terms of emergency states, a correspondence between a service type and a priority is preconfigured in the Internet of Vehicles system (such as a vehicle). When the transmission resources are insufficient, after obtaining a resource, the vehicle first transmits a V2X data packet having a higher priority. For example, a priority of a V2X data packet of the CAM type is lower than a priority of a V2X data packet of the DENM type. When the vehicle A needs to send the V2X data packet of the CAM type and the V2X data packet of the DENM type to the vehicle B, if the resource obtained by the vehicle can allow transmission of only one data packet, the vehicle first transmits the V2X data packet of the DENM type.

However, according to the technical solution in the prior art, transmission reliability of only a V2X data packet having a higher priority is ensured, and transmission reliability of a V2X data packet having a lower priority is ignored.

SUMMARY

The present invention provides a V2X communication method, device, and system, so as to resolve a problem that only transmission reliability of a data packet having a higher priority can be ensured in a current V2X communication process.

According to a first aspect, a V2X communication method is provided. The V2X communication method includes obtaining, by a terminal, a correspondence between a priority of a V2X data packet and a V2X communication parameter value range, determining, based on the priority of the V2X data packet and the correspondence, a V2X communication parameter value range corresponding to the priority of the V2X data packet, subsequently, selecting a V2X communication parameter value from the determined V2X communication parameter value range, and finally, transmitting the V2X data packet on a radio resource based on the selected V2X communication parameter value. A V2X communication parameter includes at least one of the following parameters, including an MCS (Modulation and Coding Scheme), a quantity of transmissions, transmit power, and a quantity of occupied resource blocks (RB).

It should be noted that different priorities correspond to different V2X communication parameter value ranges, the V2X communication parameter value ranges corresponding to the different priorities may overlap each other, and the V2X communication parameter value range may be a numerical value or may be an interval.

In a possible design, the correspondence between a priority and a V2X communication parameter value range may be preconfigured in the terminal. When the terminal needs to transmit the V2X data packet, the terminal determines the V2X communication parameter value range in advance based on the priority of the V2X data packet that needs to be transmitted.

In addition, in a possible design, after determining the correspondence between a priority of a V2X data packet and a V2X communication parameter, a base station may send the correspondence between a priority and a V2X communication parameter to the terminal, and the terminal obtains the correspondence between a priority and a V2X communication parameter value range by receiving the correspondence between a priority and a V2X communication parameter value range that is sent by the base station.

It should be understood that, optionally, when the correspondence between a priority and a V2X communication parameter value range is preset in the base station, the correspondence between a priority and a V2X communication parameter that is determined by the base station is the correspondence between a priority and a V2X communication parameter that is preconfigured in the base station, or when an algorithm for generating the correspondence between a priority and a V2X communication parameter value range is preconfigured in the base station, the base station determines, based on the algorithm preconfigured in the base station, the correspondence between a priority and a V2X communication parameter value range.

In a possible design, the base station sends system information block (SIB) information or radio resource control (RRC) signaling to the terminal, where the correspondence between a priority and a V2X communication parameter value range is carried by using the SIB information or the RRC signaling, and the terminal obtains the correspondence between a priority and a V2X communication parameter value range by receiving the system information block (SIB) information or the radio resource control (RRC) signaling sent by the base station.

Preferably, when transmission resources are insufficient, to ensure reliable transmission of a V2X data packet having a lower priority, a V2X communication parameter value range corresponding to the lower priority may be configured, so that the V2X data packet having the lower priority occupies fewer transmission resources, thereby improving, to some extent, reliability of the V2X data packet having the lower priority when the transmission resources are insufficient. In addition, to ensure accuracy of data transmission of a V2X data packet having a higher priority, a V2X communication parameter value range corresponding to the higher priority may be configured, and more transmission resources are allocated to the data packet having the higher priority, thereby improving, to some extent, accuracy of the V2X data packet having the higher priority.

In addition, in an embodiment of the present invention, the quantity of transmissions may be a quantity of transmissions of the V2X data packet in a media access control (MAC) layer, where the V2X data packet exists in a format of a packet data unit (PDU) in the IIAC layer, or the quantity of transmissions may be a quantity of transmissions of a side link process, where the side link process is used to transmit V2X data on a side link, or the quantity of transmissions may be a quantity of transmissions of a hybrid automatic repeat request (HARQ) process. It should be understood that, in this embodiment of the present invention, the V2X data packet may be retransmitted based on a HARQ mechanism.

In this embodiment of the present invention, the terminal transmits the V2X data packet on the radio resource based on the correspondence between a priority of a V2X data packet and a V2X communication parameter value range. Therefore, when transmission resources are insufficient, transmission reliability of a data packet having a lower priority can be improved to some extent by configuring the correspondence.

According to a second aspect, a data packet transmission method is provided. The data packet transmission method includes receiving, by a terminal, indication information from a base station, where the indication information is used to indicate a radio resource scheduled by the base station for the terminal, and transmitting a first data packet on the radio resource, where the radio resource includes an semi-persistent scheduling (SPS) radio resource or a dynamic scheduling radio resource.

It should be understood that, assuming that the terminal needs to transmit K data packets within a time period, the base station schedules, at a start moment of the time period, a radio resource in advance for the K data packets that need to be transmitted within the time period. If a data packet needs to be transmitted at a moment within the time period, the data packet is directly transmitted on the radio resource scheduled by the base station. The radio resource scheduled by the base station for data transmission by the terminal within a time period is an SPS radio resource. A dynamic scheduling radio resource is a radio resource that is scheduled, when the terminal currently needs to transmit a data packet, by the base station for the data packet that currently needs to be transmitted by the terminal.

In an embodiment of the present invention, the terminal transmits a data packet on an SPS radio resource or a dynamic scheduling radio resource scheduled by the base station. Therefore, efficiency of transmitting the data packet by the terminal is improved.

In a possible design, to improve a possibility that a size of the radio resource scheduled by the base station for the terminal is sufficient for the first data packet, the terminal determines, in data packets transmitted before the first data packet, N second data packets satisfying a preset condition, determines a target parameter based on the N second data packets, and sends the target parameter to the base station, so that the base station determines, based on the target parameter, the size of the radio resource scheduled by the base station, where N is a positive integer not less than 0, and the target parameter includes at least one of the following parameters, including a size of a largest data packet in the N second data packets, a size of a smallest data packet in the N second data packets, and an average size of the N second data packets.

It should be noted that, in this embodiment of the present invention, the preset condition may be a data packet group closest to the first data packet and transmitted before the first data packet. The data packet group includes M data packets, where M is a positive integer greater than 0. For example, the transmitted first data packet is a seventh data packet transmitted by the terminal. If a value of M is 3, the data packet group includes a fourth data packet, a fifth data packet, and a sixth data packet that are transmitted by the terminal. Alternatively, the preset condition may be a data packet within a preset time period T that is transmitted before the first data packet. For example, the preset time period T is 14:00 to 14:20, and if data packets transmitted within the time period include a fourth data packet and a fifth data packet, the fourth data packet and the fifth data packet are data packets satisfying the preset condition. If no data packet is transmitted within the time period, the target parameter is set to 0.

The value of M or a value of T may be preconfigured in the terminal, or the base station sends SIB information or RRC signaling to the terminal, where the value of M or a value of T is carried by using the SIB information or the RRC signaling, and the terminal obtains the value of M or the value of T by receiving the SIB information or the RRC signaling sent by the base station.

The terminal reports information related to a transmitted historical data packet, so that the base station can schedule the radio resource based on the information, thereby improving scheduling accuracy and efficiency.

In a possible design, to improve a possibility of successful transmission of the first data packet, optionally, after receiving the radio resource scheduled by the base station, the terminal first determines whether the size of the radio resource scheduled by the base station is sufficient for the first data packet, and if the terminals determines that the size of the radio resource scheduled by the base station is sufficient for the first data packet, the terminal transmits the first data packet on the radio resource scheduled by the base station, or if the terminal determines that the size of the radio resource scheduled by the base station is insufficient for the first data packet, the terminal sends a resource request message to the base station, where the resource request message is used to request a radio resource from the base station. If the terminal configures a limit on resource request sending, the terminal removes the limit on resource request sending, where the limit on resource request sending includes an scheduling request-mask (SR-Mask).

It should be noted that, in this embodiment of the present invention, the resource request message may include a scheduling request message or user auxiliary information. The scheduling request message is a scheduling request sent by the terminal to the base station, and indicates that data is to be sent on a terminal side but there is a lack of a corresponding resource. After receiving the scheduling request, the base station schedules a small quantity of resources for a user, so that the user reports a data volume in a buffer of the terminal. Subsequently, the base station schedules, based on the data volume in the buffer that is reported by the user, more resources for the user to send data. The scheduling request message may be transmitted on a physical uplink control channel (PUCCH) or a physical random access channel (PRACH). The user auxiliary information is user-related information reported by the user to the base station, for example, information such as a data volume, a data arrival period, an arrival moment of a data packet, and an offset of a system frame numbered 0, so that the base station schedules a resource for the user based on the received user auxiliary information.

In a possible design, this embodiment of the present invention supports V2X communication. Specifically, the radio resource scheduled by the base station is a radio resource used for V2X communication, and the first data packet is a V2X data packet.

According to a third aspect, a V2X communication method is provided. The V2X communication method includes receiving, by a terminal, first resource pool configuration information from a base station, and obtaining a first resource pool based on the first resource pool configuration information, then detecting, by the terminal, the first resource pool, and determining an available resource in the first resource pool based on a detection result, subsequently, selecting a radio resource used for V2X communication from the available resource in the first resource pool, and finally, performing V2X communication on the selected radio resource.

It should be noted that, in V2X communication, generally, when quality of a communications link between the terminal and the base station is relatively high, the base station may schedule a radio resource for the terminal, and the terminal may perform V2X communication by using the radio resource scheduled by the base station. When the quality of the communications link between the terminal and the base station deteriorates and when the quality of the communications link deteriorates to a specific degree, the base station cannot schedule a radio resource for the terminal, and the terminal needs to detect a common resource pool configured by the base station for the terminal and obtain an available radio resource from the common resource pool to perform V2X communication. However, the base station cannot schedule a radio resource for the terminal, and the terminal needs to spend some time detecting the common resource pool configured by the base station for the terminal. If the terminal needs to perform V2X communication within the time period, because there is no radio resource for communication, V2X communication cannot be performed. In an embodiment of the present invention, when the quality of the communications link between the terminal and the base station deteriorates but the base station can still allocate a radio resource to the terminal, the base station can configure the first resource pool for the terminal, and the terminal obtains a radio resource from the first resource pool. When the link between the base station and the terminal deteriorates to a specific degree and no radio resource can be scheduled for the terminal, the terminal can perform V2X communication by using the radio resource obtained from the first resource pool, thereby improving V2X communication continuity and reducing a delay of a V2X communication service to some extent.

In a possible design, the terminal receives, from the base station, an indication message for starting detection on the first resource pool, and detects the first resource pool, or detects the first resource pool after determining that quality of a communications link to the base station is less than a preset threshold.

Generally, there are a relatively small quantity of radio resources in the configured first resource pool. Therefore, when the quality of the communications link between the terminal and the base station deteriorates so that the base station cannot schedule a radio resource for the terminal and at the same time when the terminal performs V2X communication on the radio resource obtained from the first resource pool, optionally, after resource detection is completed in a second resource pool, the terminal switches to an available radio resource in the second resource pool to perform V2X communication.

It should be understood that, a radio resource in the second resource pool is larger than a radio resource in the first resource pool, and the second resource pool is equivalent to a common resource pool in the prior art. To be specific, in this embodiment of the present invention, an original manner of obtaining a radio resource by the terminal does not change, and when the terminal cannot obtain the radio resource scheduled by the base station and before a radio resource in the common resource pool is obtained, the terminal can perform V2X communication by using the radio resource obtained from the first resource pool, thereby improving V2X communication continuity.

It should be noted that, in this embodiment of the present invention, the first resource pool may alternatively be a common resource pool.

It should be noted that, in this embodiment of the present invention, the base station configures the first resource pool for the terminal, and then sends SIB information or RRC signaling to the terminal, where the SIB information or the RRC signaling carries the first resource pool configuration information, and the terminal obtains the first resource pool based on the first resource pool configuration information carried in the SIB information or the RRC signaling sent by the base station. When the base station configures the second resource pool for the terminal, a manner of obtaining the second resource pool by the terminal is similar to a manner of obtaining the first resource pool by the terminal, and details are not described herein again.

Different types of services including a V2X service and a pedestrian-to-X (pedestrian-to-entity, P2X) service are included in V2X communication. Optionally, the first resource pool configuration information and/or second resource pool configuration information carries service indication information for a resource pool. Specifically, when the first resource pool configuration information carries the service indication information for the resource pool, the service indication information is used to indicate whether the first resource pool can be used by a specific type of service, or when the second resource pool configuration information carries the service indication information for the resource pool, the service indication information is used to indicate whether the second resource pool can be used by a specific type of service. If the service indication information indicates that the resource pool cannot be used by a specific type of service, the type of service cannot use a resource in the resource pool for communication.

In V2X communication, a detection-based resource selection mechanism or a random resource selection mechanism may be used. The detection-based resource selection mechanism means that the terminal can determine an available resource in a resource pool only after detecting the resource pool for a period of time, and then selects a resource from the available resource for communication. The random resource selection mechanism means that instead of detecting a resource pool, the terminal randomly selects a resource from the resource pool and performs communication by using the selected resource. Optionally, the first resource pool configuration information and/or the second resource pool configuration information carries resource selection mechanism indication information for a resource pool. Specifically, when the first resource pool configuration information carries the resource selection mechanism indication information for the resource pool, the resource selection mechanism indication information is used to indicate whether the first resource pool uses the detection-based resource selection mechanism or the random resource selection mechanism, or whether both of the resource selection mechanisms can be used. When the second resource pool configuration information carries the resource selection mechanism indication information for the resource pool, the resource selection mechanism indication information is used to indicate whether the second resource pool uses the detection-based resource selection mechanism or the random resource selection mechanism, or whether both of the resource selection mechanisms can be used. If the resource selection mechanism indication information indicates that the resource pool cannot use a specific resource selection mechanism, a terminal using the resource pool cannot use such a resource selection mechanism for resource selection.

According to a fourth aspect, a V2X communication method is provided. The V2X communication method includes determining, by a base station, a correspondence between a priority of a V2X data packet and a V2X communication parameter value range, and sending the correspondence to a terminal, where a V2X communication parameter includes at least one of the following parameters, including an MCS, a quantity of transmissions, transmit power, and a quantity of occupied RBs.

In a possible design, the base station sends system information block SIB information or Radio Resource Control protocol RRC signaling to the terminal, where the SIB information or the RRC signaling carries the correspondence.

According to a fifth aspect, a data packet transmission method is provided. The data packet transmission method includes scheduling, by a base station, a radio resource for a terminal, and sending indication information to the terminal, where the indication information is used to indicate the radio resource scheduled for the terminal, the radio resource includes a semi-persistent scheduling SPS radio resource or a dynamic scheduling radio resource, and the radio resource is used by the terminal to transmit a first data packet.

In a possible design, the base station receives a target parameter from the terminal, determines, based on the target parameter, a size of the radio resource scheduled for the terminal, and then schedules the radio resource for the terminal, where the target parameter includes at least one of the following parameters a size of a largest data packet in N second data packets, a size of a smallest data packet in the N second data packets, and an average size of the N second data packets, where N is a positive integer not less than 0, and the N second data packets are data packets that satisfy a preset condition in data packets transmitted before the first data packet by the terminal.

In a possible design, the base station receives a resource request message sent by the terminal, and sends a radio resource indication to the terminal based on the resource request message, where the radio resource indication is used to indicate the radio resource scheduled by the base station for the terminal after the base station receives the resource request message sent by the terminal, and the resource request message is used to request a radio resource from the base station.

In a possible design, the radio resource determined by the base station is a radio resource used for V2X communication, and the first data packet is a V2X data packet.

According to a sixth aspect, a V2X communication method is provided. The V2X communication method includes determining, by a base station, a first resource pool configured for a terminal, and sending first resource pool configuration information to the terminal.

In a possible design, the base station sends the first resource pool configuration information to the terminal, and sends an indication message for starting detection on the first resource pool to the base station.

According to a seventh aspect, a V2X communication device is provided. The V2X communication device includes a processing unit and a transceiver unit. The processing unit is configured to obtain a correspondence between a priority of a V2X data packet and a V2X communication parameter value range, determine, based on the priority of the V2X data packet and the correspondence, a V2X communication parameter value range corresponding to the priority of the V2X data packet, and select a V2X communication parameter value from the determined V2X communication parameter value range, where a V2X communication parameter includes at least one of the following parameters, including a modulation and coding scheme (MCS), a quantity of transmissions, transmit power, and a quantity of occupied resource blocks (RBs). The transceiver unit is configured to transmit the V2X data packet on a radio resource based on the selected V2X communication parameter value.

In a possible design, when obtaining the correspondence, the processing unit is specifically configured to obtain the correspondence from system information block SIB information or Radio Resource Control protocol RRC signaling that is sent by a base station and received by using the transceiver unit, where the SIB information or the RRC signaling carries the correspondence, or obtain a preconfigured correspondence.

According to an eighth aspect, a data packet transmission device is provided. The data packet transmission device includes a receiving unit, a sending unit, and a processing unit. The receiving unit is configured to receive indication information from a base station, where the indication information is used to indicate a radio resource scheduled by the base station for a terminal, and the radio resource includes a semi-persistent scheduling SPS radio resource or a dynamic scheduling radio resource. The sending unit is configured to transmit a first data packet on the radio resource scheduled by the base station.

In a possible design, the processing unit is configured to, before the receiving unit receives the radio resource scheduled by the base station, determine, in data packets transmitted before the first data packet, N second data packets satisfying a preset condition, and determine a target parameter based on the N second data packets, so that the base station determines, based on the target parameter, a size of the radio resource scheduled by the base station, where N is a positive integer not less than 0, and the target parameter includes at least one of the following parameters, including a size of a largest data packet in the N second data packets, a size of a smallest data packet in the N second data packets, and an average size of the N second data packets, and the sending unit is further configured to send the target parameter to the base station.

In a possible design, the processing unit is further configured to, after the receiving unit receives the radio resource scheduled by the base station and before the sending unit transmits the first data packet, determine that the size of the radio resource scheduled by the base station is sufficient for the first data packet.

In a possible design, the sending unit is further configured to, if the processing unit determines that the size of the radio resource scheduled by the base station is insufficient for the first data packet, send a resource request message to the base station, where the resource request message is used to request a radio resource from the base station.

In a possible design, the radio resource scheduled by the base station is a radio resource used for V2X communication, and the first data packet is a V2X data packet.

According to a ninth aspect, a V2X communication device is provided. The V2X communication device includes a transceiver unit and a processing unit. The transceiver unit is configured to receive first resource pool configuration information from a base station. The processing unit is configured to obtain a first resource pool based on the first resource pool configuration information, and detect the first resource pool, then, determine an available resource in the first resource pool based on a detection result, and subsequently, select a radio resource used for V2X communication from the available resource in the first resource pool. Finally, the transceiver unit is further configured to perform V2X communication on the selected radio resource.

In a possible design, the transceiver unit is further configured to receive, from the base station, an indication message for starting detection on the first resource pool, or the processing unit is further configured to determine that quality of a communications link to the base station is less than a preset threshold.

According to a tenth aspect, a V2X communication base station is provided. The V2X communication base station includes a processing unit and a transceiver unit. The processing unit is configured to determine a correspondence between a priority of a V2X data packet and a V2X communication parameter value range, where a V2X communication parameter includes at least one of the following parameters, including a modulation and coding scheme (MCS), a quantity of transmissions, transmit power, and a quantity of occupied resource blocks (RBs). The transceiver unit is configured to send the correspondence to a terminal.

In a possible design, when sending the correspondence to the terminal, the transceiver unit is specifically configured to send system information block (SIB) information or Radio Resource Control protocol (RRC) signaling to the terminal, where the SIB information or the RRC signaling carries the correspondence.

According to an eleventh aspect, a data packet transmission base station is provided. The data packet transmission base station includes a processing unit and a transceiver unit. The processing unit is configured to schedule a radio resource for a terminal, where the radio resource includes a semi-persistent scheduling (SPS) radio resource or a dynamic scheduling radio resource, and the radio resource is used by the terminal to transmit a first data packet. The transceiver unit is configured to send indication information to the terminal, where the indication information is used to indicate the radio resource scheduled for the terminal.

In a possible design, the transceiver unit is further configured to, before the processing unit schedules the radio resource, receive a target parameter from the terminal, where the target parameter includes at least one of the following parameters, including a size of a largest data packet in N second data packets, a size of a smallest data packet in the N second data packets, and an average size of the N second data packets, where N is a positive integer not less than 0, and the N second data packets are data packets that satisfy a preset condition in data packets transmitted before the first data packet by the terminal, and the processing unit is further configured to determine, based on the target parameter, a size of the radio resource scheduled for the terminal.

In a possible design, the transceiver unit is further configured to receive a resource request message sent by the terminal, where the resource request message is used to request a radio resource from the base station, and send a radio resource indication to the terminal based on the resource request message, where the radio resource indication is used to indicate the radio resource scheduled by the base station for the terminal after the base station receives the resource request message sent by the terminal.

In a possible design, the radio resource determined by the base station is a radio resource used for V2X communication, and the first data packet is a V2X data packet.

According to a twelfth aspect, a V2X communication base station is provided. The V2X communication base station includes a processing unit and a transceiver unit. The processing unit is configured to determine a first resource pool configured for a terminal. The transceiver unit is configured to send first resource pool configuration information to the terminal.

In a possible design, the transceiver unit is further configured to send an indication message for starting detection on the first resource pool to a base station.

According to a thirteenth aspect, a V2X communication system is provided. The V2X communication system includes the device according to any possible design of the seventh aspect, and the base station according to any possible design of the tenth aspect.

According to a fourteenth aspect, a communications system for data packet transmission is provided. The communications system for data packet transmission includes the device according to any possible design of the eighth aspect, and the base station according to any possible design of the eleventh aspect.

According to a fifteenth aspect, a V2X communication system is provided. The V2X communication system includes the device according to any possible design of the ninth aspect, and the base station according to any possible design of the twelfth aspect.

DETAILED DESCRIPTION OF ILLUSTRATIVE EMBODIMENTS

To make the objectives, technical solutions, and advantages of the present invention clearer, the following further describes this application in detail with reference to the accompanying drawings.

Embodiment 1 of the present invention is applied to V2X communication, and a terminal in Embodiment 1 of the present invention may also be referred to as user equipment (UE), an mobile station (MS), a mobile terminal, or the like. Optionally, the terminal may be a mobile phone, a tablet computer, a personal digital assistant (PDA), a point of sales (POS), an in-vehicle computer, a set top box, or the like.

In Embodiment 1 of the present invention, the terminal transmits a V2X data packet on a radio resource based on a correspondence between a priority of a V2X data packet and a V2X communication parameter value range. Therefore, when transmission resources are insufficient, transmission reliability of a data packet having a lower priority can be improved to some extent by configuring the correspondence.

Figure 1:
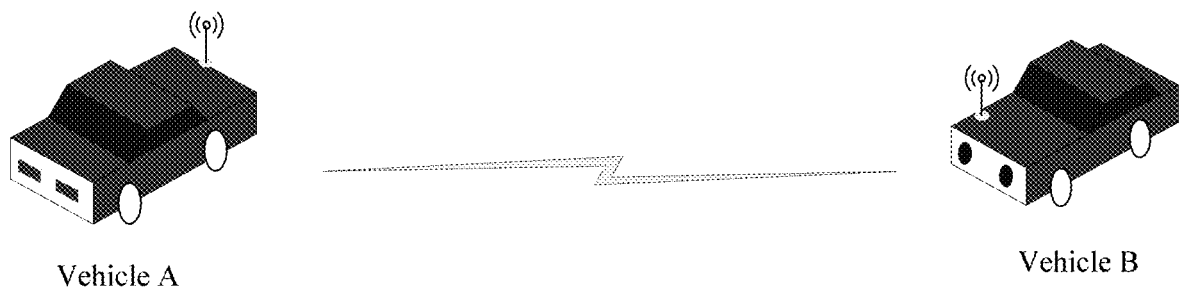
FIG. 1 is a schematic diagram of a V2V communication scenario in the prior art.
Figure 2:
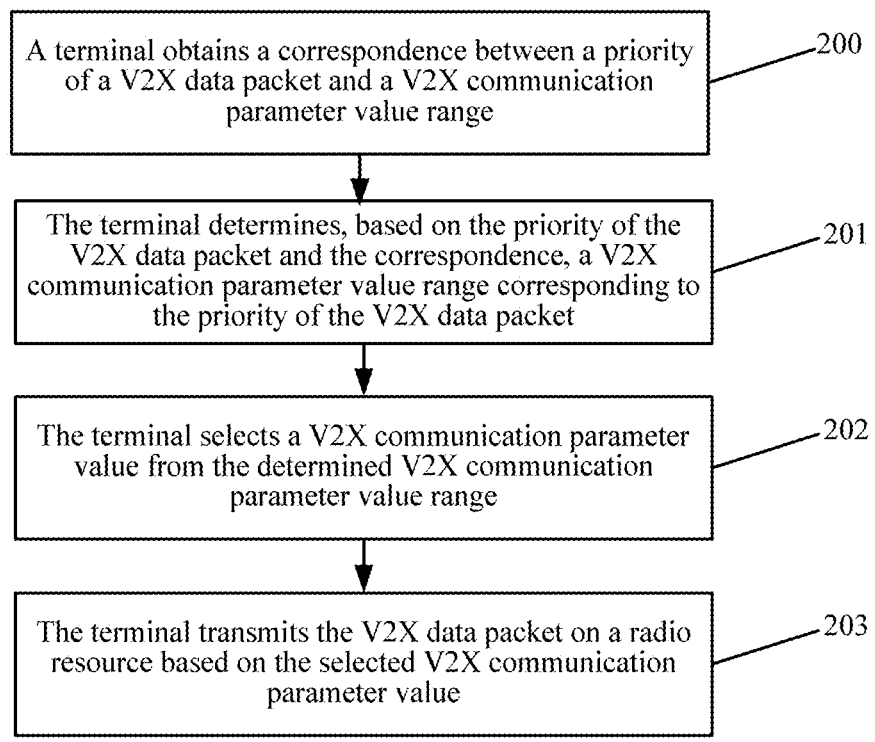
FIG. 2 is a schematic flowchart of a V2X communication method according to Embodiment 1 of the present invention.

As shown in FIG. 2, a V2X communication method in Embodiment 1 of the present invention includes the following steps.

Step 200: A terminal obtains a correspondence between a priority of a V2X data packet and a V2X communication parameter value range, where a V2X communication parameter includes at least one of the following parameters, including a modulation and coding scheme (MCS), a quantity of transmissions, transmit power, and a quantity of occupied resource blocks (RB).

Specifically, the correspondence between a priority and a V2X communication parameter value range may be preconfigured in the terminal.

In addition, after determining the correspondence between a priority of a V2X data packet and a V2X communication parameter, a base station may send the correspondence between a priority and a V2X communication parameter to the terminal, and the terminal obtains the correspondence between a priority and a V2X communication parameter value range by receiving the correspondence between a priority and a V2X communication parameter value range that is sent by the base station.

It should be understood that, optionally, when the correspondence between a priority and a V2X communication parameter value range is preset in the base station, the correspondence between a priority and a V2X communication parameter that is determined by the base station is the correspondence between a priority and a V2X communication parameter that is preconfigured in the base station, or when an algorithm for generating the correspondence between a priority and a V2X communication parameter value range is preconfigured in the base station, the base station determines, based on the algorithm preconfigured in the base station, the correspondence between a priority and a V2X communication parameter value range.

To facilitate sending the correspondence to the terminal by the base station, optionally, the base station sends SIB information or RRC signaling to the terminal, where the correspondence between a priority and a V2X communication parameter value range is carried by using the SIB information or the RRC signaling, and the terminal obtains the correspondence between a priority and a V2X communication parameter value range by receiving the SIB information or the RRC signaling sent by the base station.

Step 201: The terminal determines, based on the priority of the V2X data packet and the correspondence, a V2X communication parameter value range corresponding to the priority of the V2X data packet.

Step 202: The terminal selects a V2X communication parameter value from the determined V2X communication parameter value range.

Step 203: The terminal transmits the V2X data packet on a radio resource based on the selected V2X communication parameter value.

It should be noted that different priorities correspond to different V2X communication parameter value ranges, the V2X communication parameter value ranges corresponding to the different priorities may overlap each other, and the V2X communication parameter value range may be a numerical value or may be an interval. For example, V2X data packets having three priorities exist in V2X data packets transmitted by the terminal. Specifically, the three priorities are respectively a first priority, a second priority, and a third priority, a priority of a V2X data packet having the first priority is the highest, and a priority of a V2X data packet having the third priority is the lowest. If the V2X communication parameter includes an MCS, a quantity of transmissions, and a quantity of occupied RBs, an MCS value range corresponding to the first priority is 3 to 7, a quantity of transmissions that corresponds to the first priority is 5 to 8, and a quantity of occupied RBs that corresponds to the first priority is 10 to 16, an MCS value range corresponding to the second priority is 1 to 3, a quantity of transmissions that corresponds to the second priority is 2 to 5, and a quantity of occupied RBs that corresponds to the second priority is 4 to 10, and an MCS value range corresponding to the third priority is 0 or 1, a quantity of transmissions that corresponds to the third priority is 1, and a quantity of occupied RBs that corresponds to the third priority is 2.

Specifically, the correspondence between a priority of a V2X data packet and a V2X communication parameter value range is shown in Table 1.

TABLE 1

| | V2X communication parameter | | |
|---|---|---|---|
| Priority | MCS | Quantity of transmissions | Quantity of occupied RBs |
| First priority | 3 to 7 | 5 to 8 | 10 to 16 |
| Second priority | 1 to 3 | 2 to 5 | 4 to 10 |
| Third priority | 0 or 1 | 1 | 2 |

Assuming that when the terminal determines that a V2X data packet that currently needs to be transmitted is a data packet having the first priority, a selected MCS is 5, and a quantity of transmissions is 4, because a size of the V2X data packet that currently needs to be transmitted is fixed, a quantity of RBs that need to be occupied for transmitting the V2X data packet can be determined based on a value of the selected MCS and a value of the quantity of transmissions, and a value of the determined quantity of occupied RBs is constrained by the quantity of RBs in the V2X parameter.

Preferably, when transmission resources are insufficient, to ensure reliable transmission of a V2X data packet having a lower priority, a V2X communication parameter value range corresponding to the lower priority may be configured, so that the V2X data packet having the lower priority occupies fewer transmission resources, thereby improving, to some extent, reliability of the V2X data packet having the lower priority when the transmission resources are insufficient. In addition, to ensure accuracy of data transmission of a V2X data packet having a higher priority, a V2X communication parameter value range corresponding to the higher priority may be configured, and more transmission resources are allocated to the data packet having the higher priority, thereby improving, to some extent, accuracy of the V2X data packet having the higher priority.

In addition, in Embodiment 1 of the present invention, the quantity of transmissions may be a quantity of transmissions of the V2X data packet in a media access control (MAC) layer, where the V2X data packet exists in a format of a packet data unit (PDU) in the MAC layer, or the quantity of transmissions may be a quantity of transmissions of a side link process, where the side link process is used to transmit V2X data on a side link, or the quantity of transmissions may be a quantity of transmissions of a HARQ process. It should be understood that, in this embodiment of the present invention, the V2X data packet may be retransmitted based on a HARQ mechanism.

Embodiment 2 of the present invention is applied to wireless communications, and a terminal in Embodiment 2 of the present invention may also be referred to as UE, an MS, a mobile terminal, or the like. Optionally, the terminal may be a mobile phone, a tablet computer, a PDA, a POS, an in-vehicle computer, a set top box, or the like.

In Embodiment 2 of the present invention, the terminal transmits a data packet on an SPS radio resource or a dynamic scheduling radio resource scheduled by a base station. Therefore, efficiency of transmitting the data packet by the terminal is improved. An effective gain of the present invention is as follows. The terminal reports information related to a transmitted historical data packet, so that the base station can schedule the radio resource based on the information, thereby improving scheduling accuracy and efficiency.

The following gives detailed description by using an example in which wireless communications are V2X communication. When wireless communications are of another type of wireless communications, description is similar to that for V2X communication, and details are not described herein again.

Figure 3:
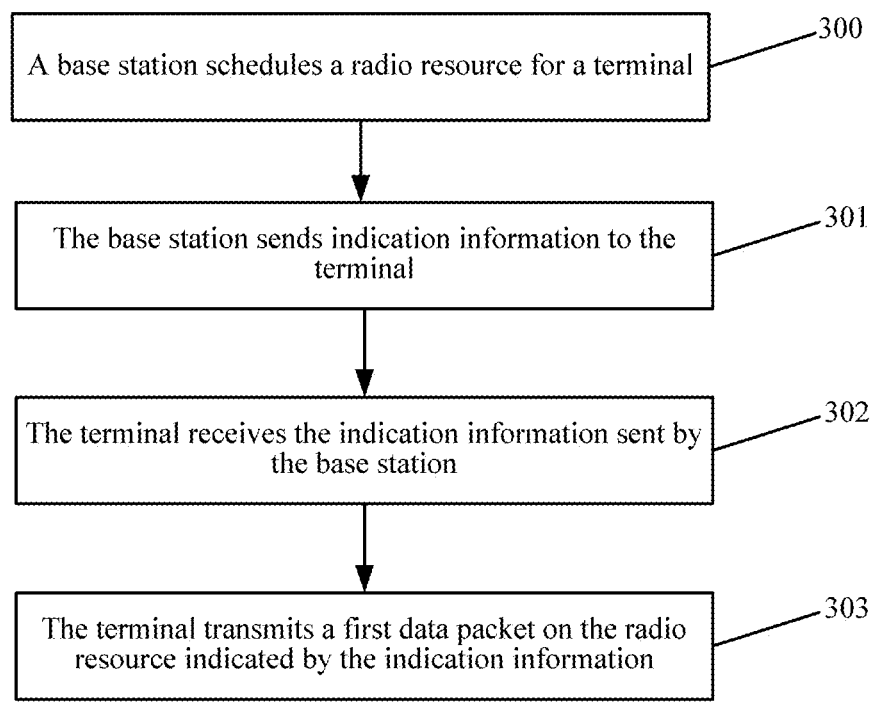
FIG. 3 is a schematic flowchart of a data packet transmission method according to Embodiment 2 of the present invention.

As shown in FIG. 3, a data packet transmission method in Embodiment 2 of the present invention includes the following steps.

Step 300: A base station schedules a radio resource for a terminal, where the radio resource includes an SPS radio resource or a dynamic scheduling radio resource, and the radio resource is used by the terminal to transmit a first data packet.

It should be understood that, assuming that the terminal needs to transmit K data packets within a time period, the base station schedules, at a start moment of the time period, a radio resource in advance for the K data packets that need to be transmitted within the time period. If a data packet needs to be transmitted at a moment within the time period, the data packet is directly transmitted on the radio resource scheduled by the base station. The radio resource scheduled by the base station for data transmission by the terminal within a time period is an SPS radio resource. A dynamic scheduling radio resource is a radio resource that is scheduled, when the terminal currently needs to transmit a data packet, by the base station for the data packet that currently needs to be transmitted by the terminal.

To improve a possibility that a size of the radio resource scheduled by the base station for the terminal is sufficient for the first data packet, optionally, the terminal determines, in data packets transmitted before the first data packet, N second data packets satisfying a preset condition, determines a target parameter based on the N second data packets, and sends the target parameter to the base station, so that the base station determines, based on the target parameter, the size of the radio resource scheduled by the base station, where N is a positive integer not less than 0, and the target parameter includes at least one of the following parameters, including a size of a largest data packet in the N second data packets, a size of a smallest data packet in the N second data packets, and an average size of the N second data packets.

It should be noted that, in Embodiment 2 of the present invention, the preset condition may be a data packet group closest to the first data packet and transmitted before the first data packet. The data packet group includes M data packets, where M is a positive integer greater than 0. For example, the transmitted first data packet is a seventh data packet transmitted by the terminal. If a value of M is 2, the data packet group includes a fifth data packet and a sixth data packet that are transmitted by the terminal. Alternatively, the preset condition may be a data packet within a preset time period T that is transmitted before the first data. For example, the preset time period is 15:00 to 15:10, and if data packets transmitted within the time period include a sixth data packet and a seventh data packet, the sixth data packet and the seventh data packet are data packets satisfying the preset condition. If no data packet is transmitted within the time period, the target parameter is set to 0.

The value of M or a value of T may be preconfigured in the terminal, or the base station sends SIB information or RRC signaling to the terminal, where the value of M or a value of T is carried by using the SIB information or the RRC signaling, and the terminal obtains the value of M or the value of T by receiving the SIB information or the RRC signaling sent by the base station.

Step 301: The base station sends indication information to the terminal, where the indication information is used to indicate the radio resource.

Step 302: The terminal receives the indication information sent by the base station.

To improve a possibility of successful transmission of the first data packet, optionally, after receiving the radio resource scheduled by the base station, the terminal first determines whether the size of the radio resource scheduled by the base station is sufficient for the first data packet, and if the terminals determines that the size of the radio resource scheduled by the base station is sufficient for the first data packet, the terminal transmits the first data packet on the radio resource scheduled by the base station, or if the terminal determines that the size of the radio resource scheduled by the base station is insufficient for the first data packet, the terminal sends a resource request message to the base station, where the resource request message is used to request a radio resource from the base station. If the terminal configures a limit on resource request sending, the terminal removes the limit on resource request sending, where the limit on resource request sending includes an SR-Mask.

It should be noted that, in this embodiment of the present invention, the resource request message may include a scheduling request message or user auxiliary information. The scheduling request message is a scheduling request sent by the terminal to the base station, and indicates that data is to be sent on a terminal side but there is a lack of a corresponding resource. After receiving the scheduling request, the base station schedules a small quantity of resources for a user, so that the user reports a data volume in a buffer of the terminal. Subsequently, the base station schedules, based on the data volume in the buffer that is reported by the user, more resources for the user to send data. The scheduling request information may be transmitted on a PUCCH or a PRACH. The user auxiliary information is user-related information reported by the user to the base station, for example, information such as a data volume, a data arrival period, an arrival moment of a data packet, and an offset of a system frame numbered 0, so that the base station schedules a resource for the user based on the received user auxiliary information.

Step 303: The terminal transmits the first data packet on the radio resource indicated by the indication information.

Optionally, Embodiment 2 of the present invention supports V2X communication. Specifically, the radio resource scheduled by the base station is a radio resource used for V2X communication, and the first data packet is a V2X data packet.

Figure 4:
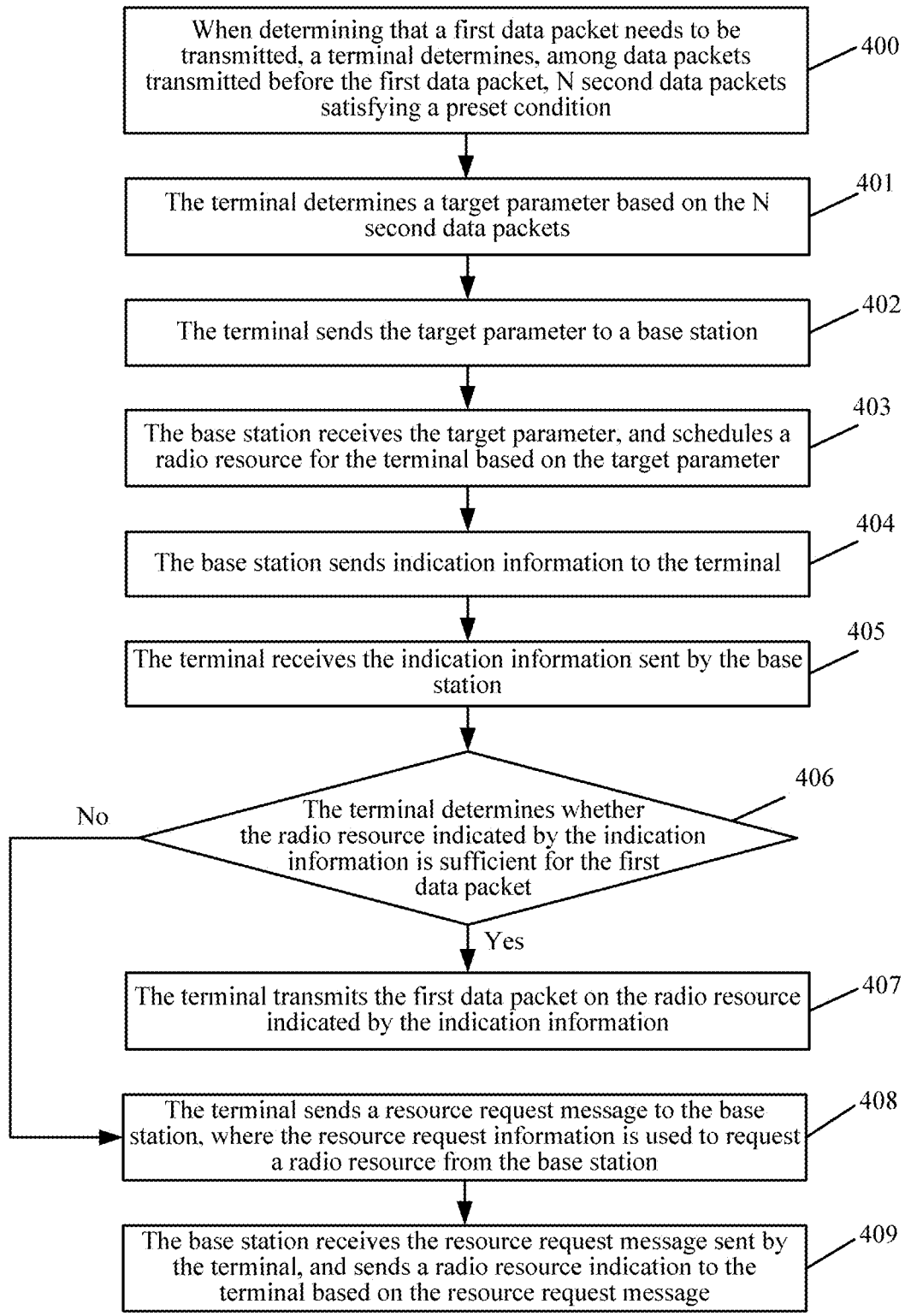
FIG. 4 is a schematic flowchart of a data packet transmission method according to Embodiment 3 of the present invention.

As shown in FIG. 4, a data packet transmission method in Embodiment 3 of the present invention includes the following steps.

Step 400: When determining that a first data packet needs to be transmitted, a terminal determines, in data packets transmitted before the first data packet, N second data packets satisfying a preset condition, where N is a positive integer not less than 0.

It should be noted that, the preset condition may be a data packet group closest to the first data packet and transmitted before the first data packet. The data packet group includes M data packets, where M is a positive integer greater than 0. For example, the transmitted first data packet is a seventh data packet transmitted by the terminal. If a value of M is 3, the data packet group includes a fourth data packet, a fifth data packet, and a sixth data packet that are transmitted by the terminal. Alternatively, the preset condition may be a data packet within a preset time period T that is transmitted before the first data. For example, the preset time period is 14:00 to 14:20, and if data packets transmitted within the time period include a fourth data packet and a fifth data packet, the fourth data packet and the fifth data packet are data packets satisfying the preset condition. If no data packet is transmitted within the time period, the target parameter is set to 0.

The value of M or a value of T may be preconfigured in the terminal, or a base station sends SIB information or RRC signaling to the terminal, where the value of M or a value of T is carried by using the SIB information or the RRC signaling, and the terminal obtains the value of M or the value of T by receiving the SIB information or the RRC signaling sent by the base station.

Step 401: The terminal determines a target parameter based on the N second data packets, where the target parameter includes at least one of the following parameters, including a size of a largest data packet in the N second data packets, a size of a smallest data packet in the N second data packets, and an average size of the N second data packets.

Step 402: The terminal sends the target parameter to a base station.

Step 403: The base station receives the target parameter, and schedules a radio resource for the terminal based on the target parameter, where the radio resource includes an SPS radio resource or a dynamic scheduling radio resource, and the radio resource is used by the terminal to transmit the first data packet.

Step 404: The base station sends indication information to the terminal, where the indication information is used to indicate the radio resource.

Step 405: The terminal receives the indication information sent by the base station.

Step 406: The terminal determines whether the radio resource indicated by the indication information is sufficient for the first data packet, and if the radio resource indicated by the indication information is sufficient for the first data packet, performs step 407, if the radio resource indicated by the indication information is insufficient for the first data packet, performs step 408.

Step 407: The terminal transmits the first data packet on the radio resource indicated by the indication information.

Step 408: The terminal sends a resource request message to the base station, where the resource request message is used to request a radio resource from the base station.

It should be noted that, the resource request message may include a scheduling request message or user auxiliary information. The scheduling request message is a scheduling request sent by the terminal to the base station, and indicates that data is to be sent on a terminal side but there is a lack of a corresponding resource. After receiving the scheduling request, the base station schedules a small quantity of resources for a user, so that the user reports a data volume in a buffer of the terminal. Subsequently, the base station schedules, based on the data volume in the buffer that is reported by the user, more resources for the user to send data. The scheduling request information may be transmitted on a PUCCH or a PRACH. The user auxiliary information is user-related information reported by the user to the base station, for example, information such as a data volume, a data arrival period, an arrival moment of a data packet, and an offset of a system frame numbered 0, so that the base station schedules a resource for the user based on the received user auxiliary information.

Step 409: The base station receives the resource request message sent by the terminal, and sends a radio resource indication to the terminal based on the resource request message, where the radio resource indication is used to indicate the radio resource scheduled by the base station for the terminal after the base station receives the resource request message sent by the terminal.

In Embodiment 2 and Embodiment 3 of the present invention, the first data packet and the second data packet are V2X data packets, and a wireless communications resource scheduled by the base station for the terminal is a radio resource used for V2X communication.

Embodiment 4 of the present invention is applied to V2X communication, and a terminal in Embodiment 4 of the present invention may also be referred to as UE, an MS, a mobile terminal, or the like. Optionally, the terminal may be a mobile phone, a tablet computer, a PDA, a POS, an in-vehicle computer, a set top box, or the like.

When the terminal cannot obtain a radio resource scheduled by a base station and before a radio resource in a common resource pool is obtained, the terminal can perform V2X communication by using a radio resource obtained from a first resource pool, thereby improving V2X communication continuity.

Figure 5:
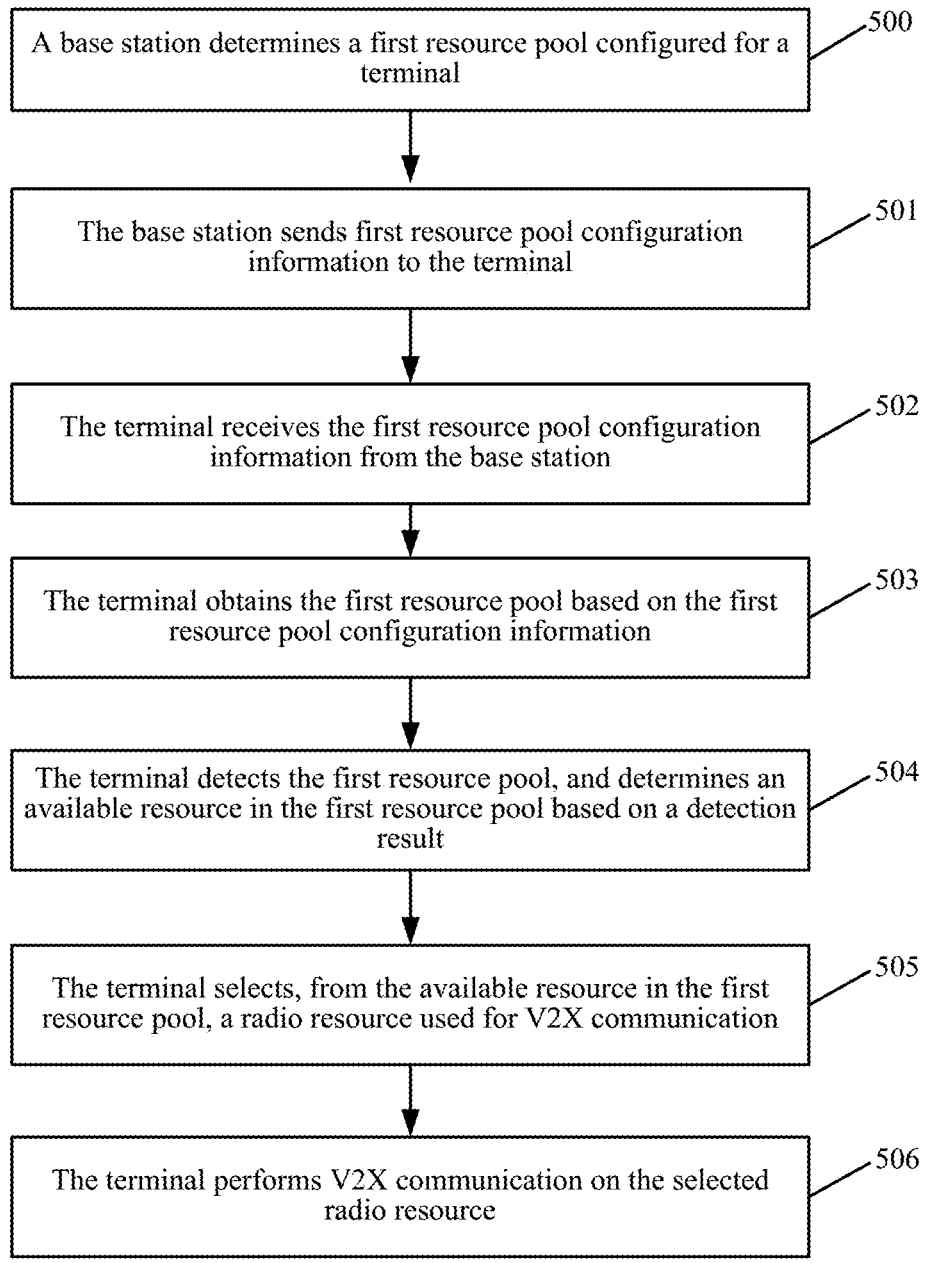
FIG. 5 is a schematic flowchart of a V2X communication method according to Embodiment 4 of the present invention.

As shown in FIG. 5, a V2X communication method in Embodiment 4 of the present invention includes the following steps.

Step 500: A base station determines a first resource pool configured for a terminal.

Step 501: The base station sends first resource pool configuration information to the terminal.

Step 502: The terminal receives the first resource pool configuration information from the base station.

Step 503: The terminal obtains the first resource pool based on the first resource pool configuration information.

Step 504: The terminal detects the first resource pool, and determines an available resource in the first resource pool based on a detection result.

Optionally, the base station sends an indication message for starting detection on the first resource pool to the terminal, and the terminal receives, from the base station, the indication message for starting detection on the first resource pool, and detects the first resource pool, or after determining that quality of a communications link to the base station is less than a preset threshold, the terminal detects the first resource pool.

It should be noted that, when detecting that the quality of the communications link to the terminal is less than the preset threshold, the base station may send the indication message for starting detection on the first resource pool to the terminal.

Step 505: The terminal selects a radio resource used for V2X communication from the available resource in the first resource pool.

Step 506: The terminal performs V2X communication on the selected radio resource.

Optionally, after the terminal completes resource detection in a second resource pool, the terminal switches to an available radio resource in the second resource pool to perform V2X communication.

Preferably, the radio resource in the second resource pool is larger than the radio resource in the first resource pool.

It should be noted that, in V2X communication, generally, when the quality of the communications link between the terminal and the base station is relatively high, the base station may schedule a radio resource for the terminal, and the terminal may perform V2X communication by using the radio resource scheduled by the base station. When the quality of the communications link between the terminal and the base station deteriorates and when the quality of the communications link deteriorates to a specific degree, the base station cannot schedule a radio resource for the terminal, and the terminal needs to detect a common resource pool configured by the base station for the terminal and obtain an available radio resource from the common resource pool to perform V2X communication. However, the base station cannot schedule a radio resource for the terminal, and the terminal needs to spend some time detecting the common resource pool configured by the base station for the terminal. If the terminal needs to perform V2X communication within the time period, because there is no radio resource for communication, V2X communication cannot be performed. In an embodiment of the present invention, when the quality of the communications link between the terminal and the base station deteriorates but the base station can still allocate a radio resource to the terminal, the base station can configure the first resource pool for the terminal, and the terminal obtains a radio resource from the first resource pool. When the link between the base station and the terminal deteriorates to a specific degree and no radio resource can be scheduled for the terminal, the terminal can perform V2X communication by using the radio resource obtained from the first resource pool, thereby improving V2X communication continuity and reducing a delay of a V2X communication service to some extent.

Therefore, the base station needs to configure the first resource pool for the terminal before the communications link between the base station and the terminal is thoroughly torn down, and the terminal obtains the available radio resource from the first resource pool before the communications link between the base station and the terminal is thoroughly torn down.

Generally, there are a relatively small quantity of radio resources in the configured first resource pool. Therefore, when the quality of the communications link between the terminal and the base station deteriorates so that the base station cannot schedule a radio resource for the terminal and at the same time when the terminal performs V2X communication on the radio resource obtained from the first resource pool, optionally, after resource detection is completed in the second resource pool, the terminal switches to the available radio resource in the second resource pool to perform V2X communication.

It should be understood that, a radio resource in the second resource pool is larger than a radio resource in the first resource pool, and the second resource pool is equivalent to a common resource pool in the prior art. To be specific, in Embodiment 4 of the present invention, an original manner of obtaining a radio resource by the terminal does not change, and when the terminal cannot obtain the radio resource scheduled by the base station and before a radio resource in the common resource pool is obtained, the terminal can perform V2X communication by using the radio resource obtained from the first resource pool, thereby improving V2X communication continuity.

It should be noted that, in Embodiment 4 of the present invention, the first resource pool may alternatively be a common resource pool.

It should be noted that, in this embodiment of the present invention, the base station configures the first resource pool for the terminal, and then sends SIB information or RRC signaling to the terminal, where the SIB information or the RRC signaling carries the first resource pool configuration information, and the terminal obtains the first resource pool based on the first resource pool configuration information carried in the SIB information or the RRC signaling sent by the base station. When the base station configures the second resource pool for the terminal, a manner of obtaining the second resource pool by the terminal is similar to a manner of obtaining the first resource pool by the terminal, and details are not described herein again.

Different types of services including a V2X service and a P2X service are included in V2X communication. Optionally, the first resource pool configuration information and/or second resource pool configuration information carries service indication information for a resource pool. Specifically, when the first resource pool configuration information carries the service indication information for the resource pool, the service indication information is used to indicate whether the first resource pool can be used by a specific type of service, or when the second resource pool configuration information carries the service indication information for the resource pool, the service indication information is used to indicate whether the second resource pool can be used by a specific type of service. If the service indication information indicates that the resource pool cannot be used by a specific type of service, the type of service cannot use a resource in the resource pool for communication.

In V2X communication, a detection-based resource selection mechanism or a random resource selection mechanism may be used. The detection-based resource selection mechanism means that the terminal can determine an available resource in a resource pool only after detecting the resource pool for a period of time, and then selects a resource from the available resource for communication. The random resource selection mechanism means that instead of detecting a resource pool, the terminal randomly selects a resource from the resource pool and performs communication by using the selected resource. Optionally, the first resource pool configuration information and/or the second resource pool configuration information carries resource selection mechanism indication information for a resource pool. Specifically, when the first resource pool configuration information carries the resource selection mechanism indication information for the resource pool, the resource selection mechanism indication information is used to indicate whether the first resource pool uses the detection-based resource selection mechanism or the random resource selection mechanism, or whether both of the resource selection mechanisms can be used. When the second resource pool configuration information carries the resource selection mechanism indication information for the resource pool, the resource selection mechanism indication information is used to indicate whether the second resource pool uses the detection-based resource selection mechanism or the random resource selection mechanism, or whether both of the resource selection mechanisms can be used. If the resource selection mechanism indication information indicates that the resource pool cannot use a specific resource selection mechanism, a terminal using the resource pool cannot use such a resource selection mechanism for resource selection.

Based on a same invention idea, embodiments of the present invention further provide a V2X communication device, base station, and system. Methods corresponding to the V2X communication device, base station, and system are the V2X communication method in Embodiment 1 of the present invention. Therefore, for implementation of the V2X communication device, base station, and system in the embodiments of the present invention, refer to implementation of the methods, and repeated parts are not described again.

Figure 6:
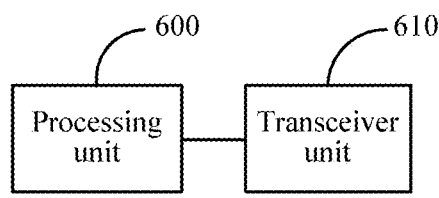
FIG. 6 is a schematic structural diagram of a V2X communication device according to an embodiment of the present invention.

As shown in FIG. 6, a V2X communication device in Embodiment 5 of the present invention includes a processing unit 600 and a transceiver unit 610. The processing unit 600 is configured to obtain a correspondence between a priority of a V2X data packet and a V2X communication parameter value range, determine, based on the priority of the V2X data packet and the correspondence, a V2X communication parameter value range corresponding to the priority of the V2X data packet, and select a V2X communication parameter value from the determined V2X communication parameter value range, where a V2X communication parameter includes at least one of the following parameters, including a modulation and coding scheme (MCS), a quantity of transmissions, transmit power, and a quantity of occupied resource blocks (RBs). The transceiver unit 610 is configured to transmit the V2X data packet on a radio resource based on the selected V2X communication parameter value.

Optionally, when obtaining the correspondence, the processing unit 600 is specifically configured to obtain the correspondence from system information block SIB information or Radio Resource Control protocol RRC signaling that is sent by a base station and received by using the transceiver unit 610, where the SIB information or the RRC signaling carries the correspondence, or obtain a preconfigured correspondence.

Figure 7:
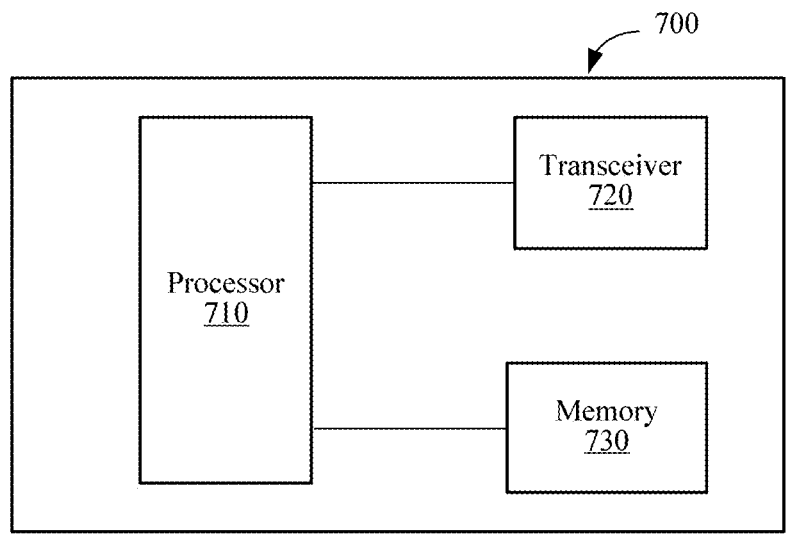
FIG. 7 is a schematic diagram of a hardware structure of a V2X communication device according to an embodiment of the present invention.

It should be noted that, in this embodiment of the present invention, the processing unit 600 may be implemented by a processor, and the transceiver unit 610 may be implemented by a transceiver. As shown in FIG. 7, a V2X communication device 700 may include a processor 710, a transceiver 720, and a memory 730. The memory 730 may be configured to store a program/code that is preset upon delivery of the device 700, or may store code to be executed by the processor 710, or the like.

The processor 710 may use a general central processing unit (CPU), a microprocessor, an application specific integrated circuit (ASIC), or one or more integrated circuits, and is configured to perform related operations to implement the technical solutions provided in the embodiments of the present invention.

It should be noted that, although for the device 700 shown in FIG. 7, only the processor 710, the transceiver 720, and the memory 730 are shown, during specific implementation, persons skilled in the art should understand that the device 700 further includes other necessary components for implementing normal running. In addition, according to specific requirements, persons skilled in the art should understand that the device 700 may further include a hardware component for implementing another additional function. Furthermore, persons skilled in the art should understand that the device may include only necessary components or modules for implementing the embodiments of the present invention, instead of including all components shown in FIG. 7.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a read-only memory (ROM), a random access memory (RAM), or the like.

Figure 8:
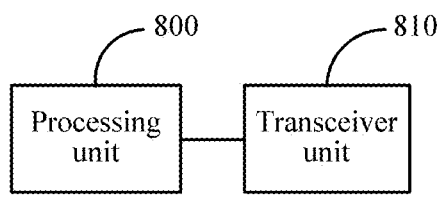
FIG. 8 is a schematic structural diagram of a V2X communication base station according to an embodiment of the present invention.

As shown in FIG. 8, a V2X communication base station in an embodiment of the present invention includes a processing unit 800 and a transceiver unit 810. The processing unit 800 is configured to determine a correspondence between a priority of a V2X data packet and a V2X communication parameter value range, where a V2X communication parameter includes at least one of the following parameters, including a modulation and coding scheme (MCS), a quantity of transmissions, transmit power, and a quantity of occupied resource blocks RBs. The transceiver unit 810 is configured to send the correspondence to a terminal.

Optionally, when sending the correspondence to the terminal, the transceiver unit 810 is specifically configured to send system information block SIB information or Radio Resource Control protocol RRC signaling to the terminal, where the SIB information or the RRC signaling carries the correspondence.

Figure 9:
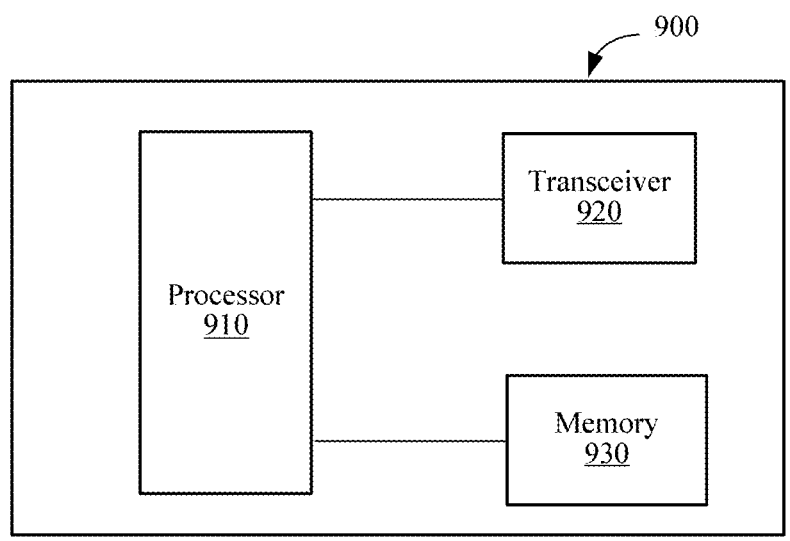
FIG. 9 is a schematic diagram of a hardware structure of a V2X communication base station according to an embodiment of the present invention.

It should be noted that, in this embodiment of the present invention, the processing unit 800 may be implemented by a processor, and the transceiver unit 810 may be implemented by a transceiver. As shown in FIG. 9, a V2X communication base station 900 may include a processor 910, a transceiver 920, and a memory 930. The memory 930 may be configured to store a program/code that is preset upon delivery of the base station 900, or may store code to be executed by the processor 910, or the like.

The processor 910 may use a general CPU, a microprocessor, an ASIC, or one or more integrated circuits, and is configured to perform related operations to implement the technical solutions provided in the embodiments of the present invention.

It should be noted that, although for the base station 900 shown in FIG. 9, only the processor 910, the transceiver 920, and the memory 930 are shown, during specific implementation, persons skilled in the art should understand that the base station 900 further includes other necessary components for implementing normal running. In addition, according to specific requirements, persons skilled in the art should understand that the base station 900 may further include a hardware component for implementing another additional function. Furthermore, persons skilled in the art should understand that the base station may include only necessary components or modules for implementing the embodiments of the present invention, instead of including all components shown in FIG. 9.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a ROM, a RAM, or the like.

Figure 10:
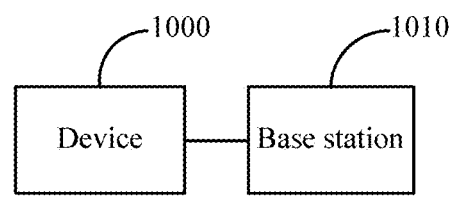
FIG. 10 is a schematic structural diagram of a V2X communication base station system according to an embodiment of the present invention.

As shown in FIG. 10, a V2X communication system in an embodiment of the present invention includes any device 1000 shown in FIG. 6 according to the embodiments of the present invention, and any base station 1010 shown in FIG. 8 according to the embodiments of the present invention.

Based on a same invention idea, embodiments of the present invention further provide a data packet transmission device, base station, and system. Methods corresponding to the data packet transmission device, base station, and system are the data packet transmission methods in Embodiment 2 and Embodiment 3 in the present invention. Therefore, for implementation of the data packet transmission device, base station, and system in the embodiments of the present invention, refer to implementation of the methods, and repeated parts are not described again.

Figure 11:
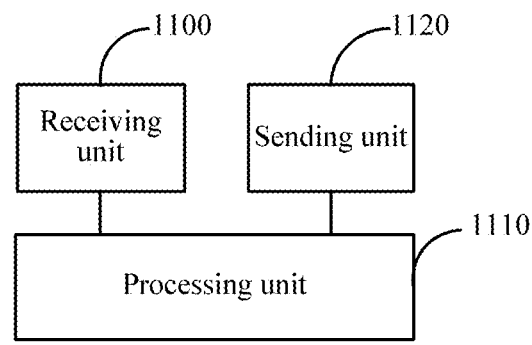
FIG. 11 is a schematic structural diagram of a data packet transmission device according to an embodiment of the present invention.

As shown in FIG. 11, a data packet transmission device in an embodiment of the present invention includes a receiving unit 1100, a sending unit 1120, and a processing unit 1110. The receiving unit 1100 is configured to receive indication information from a base station, where the indication information is used to indicate a radio resource scheduled by the base station for a terminal, and the radio resource includes a semi-persistent scheduling SPS radio resource or a dynamic scheduling radio resource. The sending unit 1120 is configured to transmit a first data packet on the radio resource scheduled by the base station.

Optionally, the processing unit 1110 is configured to, before the receiving unit 1100 receives the radio resource scheduled by the base station, determine, in data packets transmitted before the first data packet, N second data packets satisfying a preset condition, and determine a target parameter based on the N second data packets, so that the base station determines, based on the target parameter, a size of the radio resource scheduled by the base station, where N is a positive integer not less than 0, and the target parameter includes at least one of the following parameters, including a size of a largest data packet in the N second data packets, a size of a smallest data packet in the N second data packets, and an average size of the N second data packets, and the sending unit 1120 is further configured to send the target parameter to the base station.

Optionally, the processing unit 1110 is further configured to, after the receiving unit 1100 receives the radio resource scheduled by the base station, and before the sending unit 1120 transmits the first data packet, determine that the size of the radio resource scheduled by the base station is sufficient for the first data packet.

Optionally, the sending unit 1120 is further configured to, if the processing unit 1110 determines that the size of the radio resource scheduled by the base station is insufficient for the first data packet, send a resource request message to the base station, where the resource request message is used to request a radio resource from the base station.

The radio resource scheduled by the base station is a radio resource used for V2X communication, and the first data packet is a V2X data packet.

Figure 12:
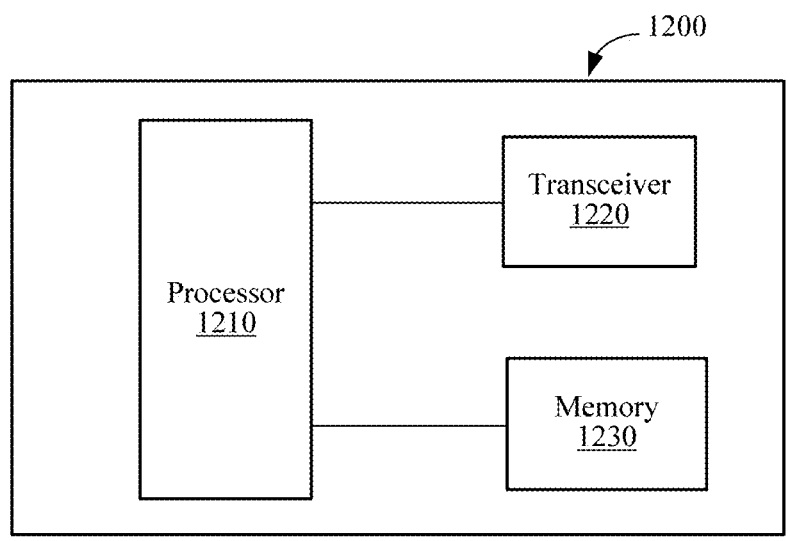
FIG. 12 is a schematic diagram of a hardware structure of a data packet transmission device according to an embodiment of the present invention.

It should be noted that, in this embodiment of the present invention, the processing unit 1110 may be implemented by a processor, and the receiving unit 1100 and the sending unit 1120 may be implemented by a transceiver. As shown in FIG. 12, a data packet transmission device 1200 may include a processor 1210, a transceiver 1220, and a memory 1230. The memory 1230 may be configured to store a program/code that is preset upon delivery of the device 1200, or may store code to be executed by the processor 1210, or the like.

The processor 1210 may use a general CPU, a microprocessor, an ASIC, or one or more integrated circuits, and is configured to perform related operations to implement the technical solutions provided in the embodiments of the present invention.

It should be noted that, although for the device 1200 shown in FIG. 12, only the processor 1210, the transceiver 1220, and the memory 1230 are shown, during specific implementation, persons skilled in the art should understand that the device 1200 further includes other necessary components for implementing normal running. In addition, according to specific requirements, persons skilled in the art should understand that the device 1200 may further include a hardware component for implementing another additional function. In addition, persons skilled in the art should understand that the device may include only necessary components or modules for implementing the embodiments of the present invention, instead of including all components shown in FIG. 12.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a ROM, a RAM, or the like.

Figure 13:
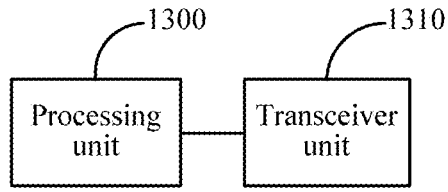
FIG. 13 is a schematic structural diagram of a data packet transmission base station according to an embodiment of the present invention.

As shown in FIG. 13, a data packet transmission base station includes a processing unit 1300 and a transceiver unit 1310. The processing unit 1300 is configured to schedule a radio resource for a terminal, where the radio resource includes a semi-persistent scheduling SPS radio resource or a dynamic scheduling radio resource, and the radio resource is used by the terminal to transmit a first data packet. The transceiver unit 1310 is configured to send indication information to the terminal, where the indication information is used to indicate the radio resource scheduled for the terminal.

Optionally, the transceiver unit 1310 is further configured to, before the processing unit 1300 schedules the radio resource, receive a target parameter of the terminal, where the target parameter includes at least one of the following parameters, including a size of a largest data packet in N second data packets, a size of a smallest data packet in the N second data packets, and an average size of the N second data packets, where N is a positive integer not less than 0, and the N second data packets are data packets that satisfy a preset condition in data packets transmitted before the first data packet by the terminal, and the processing unit 1300 is further configured to determine, based on the target parameter, a size of the radio resource scheduled for the terminal.

Optionally, the transceiver unit 1310 is further configured to receive a resource request message sent by the terminal, where the resource request message is used to request a radio resource from the base station, and send a radio resource indication to the terminal based on the resource request message, where the radio resource indication is used to indicate the radio resource scheduled by the base station for the terminal after the base station receives the resource request message sent by the terminal.

Optionally, the radio resource determined by the base station is a radio resource used for V2X communication, and the first data packet is a V2X data packet.

Figure 14:
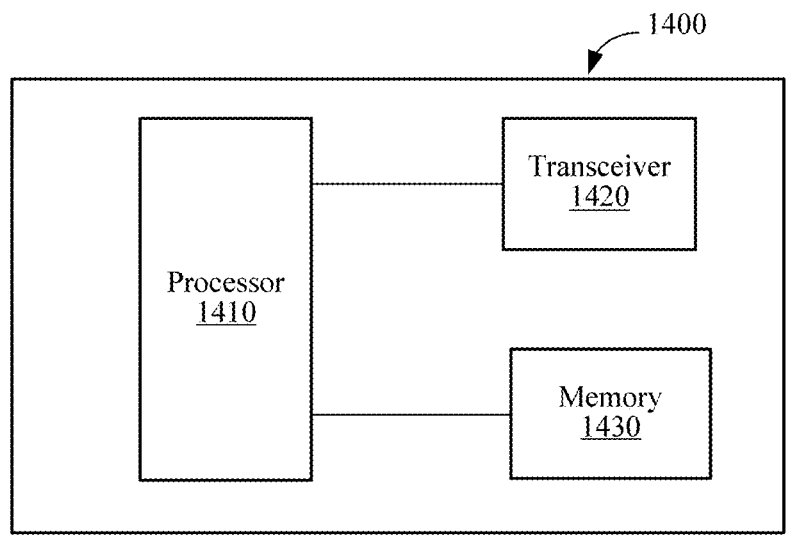
FIG. 14 is a schematic diagram of a hardware structure of a data packet transmission base station according to an embodiment of the present invention.

It should be noted that, in this embodiment of the present invention, the processing unit 1300 may be implemented by a processor, and the transceiver unit 1310 may be implemented by a transceiver. As shown in FIG. 14, a data packet transmission base station 1400 may include a processor 1410, a transceiver 1420, and a memory 1430. The memory 1430 may be configured to store a program/code that is preset upon delivery of the base station 1400, or may store code to be executed by the processor 1410, or the like.

The processor 1410 may use a general CPU, a microprocessor, an ASIC, or one or more integrated circuits, and is configured to perform related operations to implement the technical solutions provided in the embodiments of the present invention.

It should be noted that, although for the base station 1400 shown in FIG. 14, only the processor 1410, the transceiver 1420, and the memory 1430 are shown, during specific implementation, persons skilled in the art should understand that the base station 1400 further includes other necessary components for implementing normal running. In addition, according to specific requirements, persons skilled in the art should understand that the base station 1400 may further include a hardware component for implementing another additional function. Furthermore, persons skilled in the art should understand that the base station may include only necessary components or modules for implementing the embodiments of the present invention, instead of including all components shown in FIG. 14.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a ROM, a RAM, or the like.

Figure 15:
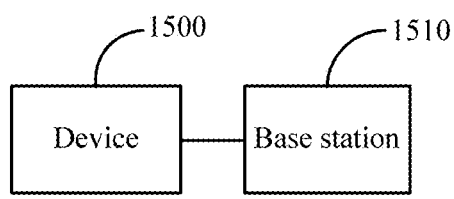
FIG. 15 is a schematic structural diagram of a data packet transmission system according to an embodiment of the present invention.

As shown in FIG. 15, a data packet transmission system in an embodiment of the present invention includes any device 1500 shown in FIG. 11 according to the embodiments of the present invention, and any base station 1510 shown in FIG. 13 according to the embodiments of the present invention.

Based on a same invention idea, embodiments of the present invention further provide a V2X communication device, base station, and system. Methods corresponding to the V2X communication device, base station, and system are the V2X communication method in Embodiment 4 of the present invention. Therefore, for implementation of the V2X communication device, base station, and system in the embodiments of the present invention, refer to implementation of the methods, and repeated parts are not described again.

Figure 16:
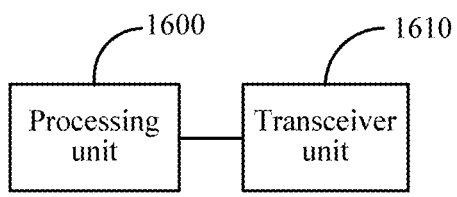
FIG. 16 is a schematic structural diagram of a V2X communication device according to an embodiment of the present invention.

As shown in FIG. 16, a V2X communication device in an embodiment of the present invention includes a transceiver unit 1610 and a processing unit 1600. The transceiver unit 1610 is configured to receive first resource pool configuration information from a base station. The processing unit 1600 is configured to obtain a first resource pool based on the first resource pool configuration information, and detect the first resource pool, then, determine an available resource in the first resource pool based on a detection result, and subsequently, select a radio resource used for V2X communication from the available resource in the first resource pool. Finally, the transceiver unit 1610 is further configured to perform V2X communication on the selected radio resource.

Optionally, the transceiver unit 1610 is further configured to receive, from the base station, an indication message for starting detection on the first resource pool, or the processing unit 1600 is further configured to determine that quality of a communications link to the base station is less than a preset threshold.

Figure 17:
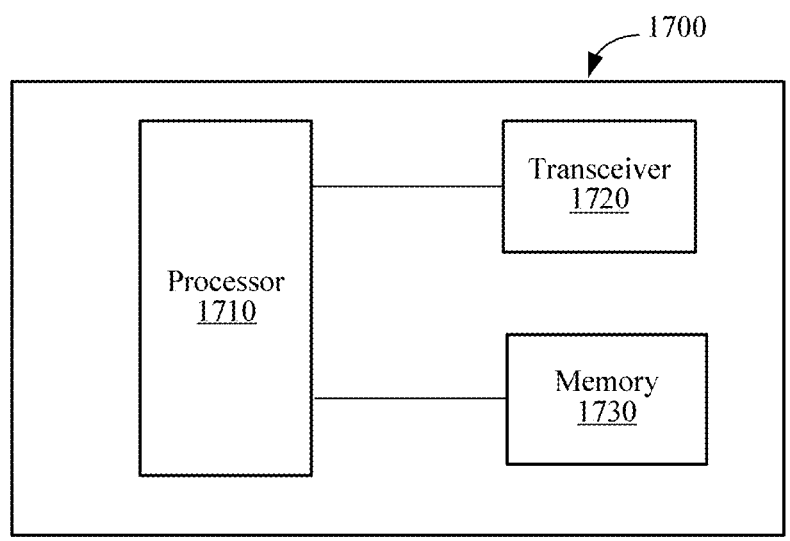
FIG. 17 is a schematic diagram of a hardware structure of a V2X communication device according to an embodiment of the present invention.

It should be noted that, in this embodiment of the present invention, the processing unit 1600 may be implemented by a processor, and the transceiver unit 1610 may be implemented by a transceiver. As shown in FIG. 17, a V2X communication device 1700 may include a processor 1710, a transceiver 1720, and a memory 1730. The memory 1730 may be configured to store a program/code that is preset upon delivery of the device 1700, or may store code to be executed by the processor 1710, or the like.

The processor 1710 may use a general CPU, a microprocessor, an ASIC, or one or more integrated circuits, and is configured to perform related operations to implement the technical solutions provided in the embodiments of the present invention.

It should be noted that, although for the device 1700 shown in FIG. 17, only the processor 1710, the transceiver 1720, and the memory 1730 are shown, during specific implementation, persons skilled in the art should understand that the device 1700 further includes other necessary components for implementing normal running. In addition, according to specific requirements, persons skilled in the art should understand that the device 1700 may further include a hardware component for implementing another additional function. Furthermore, persons skilled in the art should understand that the device may include only necessary components or modules for implementing the embodiments of the present invention, instead of including all components shown in FIG. 17.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a ROM, a RAM, or the like.

Figure 18:
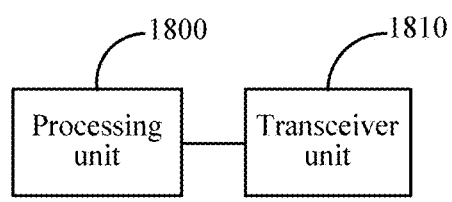
FIG. 18 is a schematic structural diagram of a V2X communication base station according to an embodiment of the present invention.

As shown in FIG. 18, a V2X communication base station in an embodiment of the present invention includes a processing unit 1800 and a transceiver unit 1810. The processing unit 1800 is configured to determine a first resource pool configured for a terminal. The transceiver unit 1810 is configured to send first resource pool configuration information to the terminal.

Optionally, the transceiver unit 1810 is further configured to send an indication message for starting detection on the first resource pool to a base station.

Figure 19:
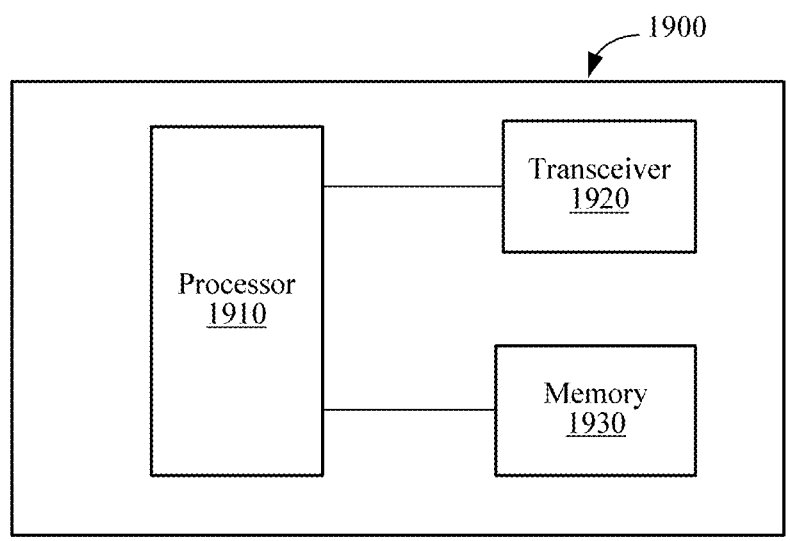
FIG. 19 is a schematic diagram of a hardware structure of a V2X communication base station according to an embodiment of the present invention.

It should be noted that, in this embodiment of the present invention, the processing unit 1800 may be implemented by a processor, and the transceiver unit 1810 may be implemented by a transceiver. As shown in FIG. 19, a V2X communication base station 1900 may include a processor 1910, a transceiver 1920, and a memory 1930. The memory 1930 may be configured to store a program/code that is preset upon delivery of the base station 1900, or may store code to be executed by the processor 1910, or the like.

The processor 1910 may use a general CPU, a microprocessor, an ASIC, or one or more integrated circuits, and is configured to perform related operations to implement the technical solutions provided in the embodiments of the present invention.

It should be noted that, although for the base station 1900 shown in FIG. 19, only the processor 1910, the transceiver 1920, and the memory 1930 are shown, during specific implementation, persons skilled in the art should understand that the base station 1900 further includes other necessary components for implementing normal running. In addition, according to specific requirements, persons skilled in the art should understand that the base station 1900 may further include a hardware component for implementing another additional function. Furthermore, persons skilled in the art should understand that the base station may include only necessary components or modules for implementing the embodiments of the present invention, instead of including all components shown in FIG. 19.

Persons of ordinary skill in the art may understand that all or some of the procedures of the methods in the embodiments may be implemented by a computer program instructing relevant hardware. The program may be stored in a computer readable storage medium. When the program runs, the procedures of the methods embodiments may be included. The storage medium may be a magnetic disk, an optical disk, a ROM, a RAM, or the like.

Figure 20:
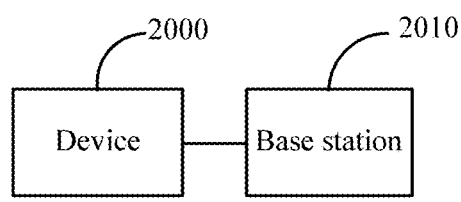
FIG. 20 is a schematic structural diagram of a V2X communication base station system according to an embodiment of the present invention.

As shown in FIG. 20, a V2X communication system in an embodiment of the present invention includes a device 2000 shown in FIG. 16 according to the embodiments of the present invention and a base station 2010 shown in FIG. 18 according to the embodiments of the present invention.

It may be learned from the foregoing content that, in the embodiments of the present invention, the terminal obtains the correspondence between a priority of a V2X data packet and a V2X communication parameter value range, determines, based on the priority of the V2X data packet and the correspondence, the V2X communication parameter value range corresponding to the priority of the V2X data packet, subsequently, selects a V2X communication parameter value from the determined V2X communication parameter value range, and finally, transmits the V2X data packet on the radio resource based on the selected V2X communication parameter value. The V2X communication parameter includes at least one of the following parameters, including an MCS, a quantity of transmissions, transmit power, and a quantity of occupied RBs. According to the technical solutions, the terminal transmits the V2X data packet on the radio resource based on the correspondence between a priority of a V2X data packet and a V2X communication parameter value range. Therefore, when transmission resources are insufficient, transmission reliability of a data packet having a lower priority can be improved to some extent by configuring the correspondence.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A vehicle-to-entity (V2X) communication method, comprising:
    obtaining, by a terminal, a correspondence between a priority of a V2X service data packet and a V2X communication parameter value range for a V2X communication parameter, wherein the V2X communication parameter comprises at least one of a modulation and coding scheme (MCS), a quantity of transmissions, a transmit power, or a quantity of occupied resource blocks (RBs);
    determining, by the terminal, according to the priority of the V2X service data packet and the correspondence, the V2X communication parameter value range corresponding to the priority of the V2X service data packet;
    selecting, by the terminal, a V2X communication parameter value from the determined V2X communication parameter value range;
    receiving, by the terminal, first resource pool configuration information, wherein the first resource pool configuration information indicates a first resource pool, wherein the first resource pool comprises a radio resource, wherein the first resource pool configuration information comprises a service indication information, wherein the service indication information indicates that the first resource pool can be used by a V2X service, and wherein the first resource pool configuration information further comprises resource selection mechanism indication information, wherein the resource selection mechanism indication information indicates whether the first resource pool uses a sensing-based resource selection mechanism, or a random resource selection mechanism, or a combination of the sensing-based resource selection mechanism and the random resource selection mechanism; and
    transmitting, by the terminal, the V2X service data packet on the radio resource according to the V2X communication parameter value.

2. The method according to claim 1, wherein the obtaining the correspondence between the priority of the V2X service data packet and the V2X communication parameter value range comprises performing at least one of:
    obtaining, by the terminal, at least one of a system information block (SIB) information or Radio Resource Control protocol (RRC) signaling, wherein the at least one of the SIB information or RRC signaling indicates the correspondence; or
    obtaining, by the terminal, a preconfigured correspondence.

3. A vehicle-to-entity (V2X) communication method, comprising:
    determining, by a base station, a correspondence between a priority of a V2X service data packet and a V2X communication parameter value range for a V2X communication parameter, wherein the V2X communication parameter comprises at least one of a modulation and coding scheme (MCS), a quantity of transmissions, transmit power, or a quantity of occupied resource blocks (RBs);
    determining, by the base station, a first resource pool;
    sending, by the base station, the correspondence to a terminal; and
    sending, by the base station, first resource pool configuration information to the terminal, wherein the first resource pool configuration information indicates the first resource pool;
    wherein the first resource pool configuration information comprises service indication information, wherein the service indication information indicates that the first resource pool can be used by a V2X service, wherein the first resource pool configuration information further comprises resource selection mechanism indication information, and wherein the resource selection mechanism indication information indicates whether the first resource pool uses a sensing-based resource selection mechanism, or a random resource selection mechanism, or a combination of the sensing-based resource selection mechanism and the random resource selection mechanism.

4. The method according to claim 3, wherein the sending the correspondence to the terminal comprises:
    sending, by the base station, at least one of system information block (SIB) information or Radio Resource Control protocol (RRC) signaling to the terminal, wherein the SIB information or the RRC signaling indicates the correspondence.

5. A vehicle-to-entity (V2X) communication device, comprising:
    a transmitter;
    a processor;
    a non-transitory computer-readable storage medium storing a program to be executed by the processor, the program including instructions to:
        obtain a correspondence between a priority of a V2X service data packet and a V2X communication parameter value range for a V2X communication parameter, wherein the V2X communication parameter comprises at least one of a modulation and coding scheme (MCS), a quantity of transmissions, a transmit power, or a quantity of occupied resource blocks (RBs);
        determine, according to the priority of the V2X service data packet and the correspondence, the V2X communication parameter value range corresponding to the priority of the V2X service data packet;

select a V2X communication parameter value from the determined V2X communication parameter value range;

receive first resource pool configuration information, wherein the first resource pool configuration information indicates a first resource pool, wherein the first resource pool comprises a radio resource, wherein the first resource pool configuration information comprises a service indication information, wherein the service indication information indicates that the first resource pool can be used by a V2X service, and wherein the first resource pool configuration information further comprises resource selection mechanism indication information, wherein the resource selection mechanism indication information indicates whether the first resource pool uses a sensing-based resource selection mechanism, or a random resource selection mechanism, or a combination of the sensing-based resource selection mechanism and the random resource selection mechanism; and cause the transmitter to transmit the V2X service data packet on a radio resource according to the V2X communication parameter value.

6. The device according to claim 5, wherein the instructions to obtain the correspondence include instructions to perform at least one of:

obtain at least one of system information block (SIB) information or Radio Resource Control protocol (RRC) signaling, wherein the at least one of the SIB information or the RRC signaling indicates the correspondence; or obtain a preconfigured correspondence.

7. A base station, comprising:

a transmitter;

a processor; and a non-transitory computer-readable storage medium storing a program to be executed by the processor, the program including instructions to:

determine a correspondence between a priority of a vehicle-to-entity (V2X) service data packet and a V2X communication parameter value range for a first V2X communication parameter, wherein the V2X communication parameter comprises at least one of a modulation and coding scheme (MCS), a quantity of transmissions, transmit power, or a quantity of occupied resource blocks (RBs);

determine a first resource pool;

cause the transmitter to send the correspondence to a terminal; and cause the transmitter to send first resource pool configuration information to the terminal, wherein the first resource pool configuration information indicates the first resource pool;

wherein the first resource pool configuration information comprises service indication information, wherein the service indication information indicates that the first resource pool can be used by a V2X service, wherein the first resource pool configuration information further comprises resource selection mechanism indication information, and wherein the resource selection mechanism indication information indicates whether the first resource pool uses a sensing-based resource selection mechanism, or a random resource selection mechanism, or a combination of the sensing-based resource selection mechanism and the random resource selection mechanism.

8. The base station according to claim 7, wherein, the program further includes instructions to cause the transmitter to send system information block (SIB) information or Radio Resource Control protocol (RRC) signaling to the terminal, wherein the SIB information or the RRC signaling indicate the correspondence.

9. A non-transitory computer readable medium, wherein the non-transitory computer readable medium stores a program, the program including instructions, which when executed by a computer, cause the computer to:

obtain a correspondence between a priority of a vehicle-to-entity (V2X) service data packet and a V2X communication parameter value range for a V2X communication parameter, wherein the V2X communication parameter comprises at least one of a modulation and coding scheme (MCS), a quantity of transmissions, transmit power, or a quantity of occupied resource blocks (RBs);

determine, according to the priority of the V2X service data packet and the correspondence, a V2X communication parameter value range corresponding to the priority of the V2X service data packet;

select the V2X communication parameter value from the determined V2X communication parameter value range;

receive first resource pool configuration information, wherein the first resource pool configuration information indicates a first resource pool, wherein the first resource pool comprises a radio resource, wherein the first resource pool configuration information comprises a service indication information, wherein the service indication information indicates that the first resource pool can be used by a V2X service, and wherein the first resource pool configuration information further comprises resource selection mechanism indication information, wherein the resource selection mechanism indication information indicates whether the first resource pool uses a sensing-based resource selection mechanism, or a random resource selection mechanism, or a combination of the sensing-based resource selection mechanism and the random resource selection mechanism; and transmit the V2X service data packet on a radio resource according to the V2X communication parameter value.

10. The non-transitory computer readable medium according to claim 9, wherein the instructions to obtain the correspondence include instructions, which when executed by a computer, cause the computer to perform at least one of:

obtain at least one of system information block (SIB) information or Radio Resource Control protocol (RRC) signaling, wherein the at least one of the SIB information or RRC signaling indicates the correspondence; or obtain a preconfigured correspondence.

11. A non-transitory computer readable medium, wherein the non-transitory computer readable medium stores a program, the program including instructions, which when executed by a computer, cause the computer to:

determine a correspondence between a priority of a V2X service data packet and a vehicle-to-entity (V2X) communication parameter value range, wherein the V2X communication parameter comprises at least one of a modulation and coding scheme (MCS), a quantity of transmissions, a transmit power, and a quantity of occupied resource blocks (RBs);

determine a first resource pool;

send the correspondence to a terminal; and send first resource pool configuration information to the terminal, wherein the first resource pool configuration information indicates the first resource pool;

wherein the first resource pool configuration information comprises service indication information, wherein the service indication information indicates that the first resource pool can be used by a V2X service, wherein the first resource pool configuration information further comprises resource selection mechanism indication information, and wherein the resource selection mechanism indication information indicates whether the first resource pool uses a sensing-based resource selection mechanism, or a random resource selection mechanism, or a combination of the sensing-based resource selection mechanism and the random resource selection mechanism.

12. The non-transitory computer readable medium according to claim 11, wherein the program further includes instructions, which when executed by a computer, cause the computer to:

send at least one of system information block (SIB) information or Radio Resource Control protocol (RRC) signaling to the terminal, wherein the at least one of the SIB information or the RRC signaling is used to indicate the correspondence.

\* \* \* \* \*